DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 7

T951,005

IRRADIATION CURE PROCESSING OF ELASTOMERIC COMPONENTS

Paul D. Bowers, Akron, Jerry D. Hunt, Uniontown, and Charles C. Raines, Canton, Ohio, assignors to The Firestone Tire & Rubber Company, Akron, Ohio Continuation of application Ser. No. 184,187, Sept. 27, 1971. This application Aug. 14, 1975, Ser. No. 604,685

Int. Cl.[2] B29H *5/00, 5/26*

U.S. Cl. 264—22

No Drawing. 14 Pages Specification

A process for increasing the green strength of various components in the construction of tires, conveyor belting, fuel cells, and other similar elastomeric articles. The process may be used either on tire components such as chafer strips, non-black sidewalls, veneer strips and innerliners, in the latter case effecting bladderless curing, or on skim coated fabrics generally incorporated in elastomeric articles. The process is carried out by irradiation of mixtures of synthetic rubber and other materials having little or no natural rubber therein and yet having a green strength sufficient to withstand various processing operations for the manufacture of such articles.